United States Patent

Stager

[11] 4,111,407
[45] Sep. 5, 1978

[54] CONICAL COMPRESSION SPRING

[75] Inventor: Francis W. Stager, Stafford Springs, Conn.

[73] Assignee: Litton Industrial Products, Inc., East Hartford, Conn.

[21] Appl. No.: 728,273

[22] Filed: Sep. 30, 1976

[51] Int. Cl.$^2$ .............................................. F16F 1/08
[52] U.S. Cl. ...................................... 267/166; 267/62
[58] Field of Search ................ 267/60, 61 R, 62, 166, 267/180; 29/173; 72/138, 139, 143, 146; 140/71 C, 103

[56] References Cited

U.S. PATENT DOCUMENTS 380,651  4/1888  Fowler et al. .......................... 267/62

FOREIGN PATENT DOCUMENTS 2,000,472  7/1971  Fed. Rep. of Germany ........... 267/166
1,934,984  1/1971  Fed. Rep. of Germany ............. 267/62

*Primary Examiner*—Johnny D. Cherry
*Attorney, Agent, or Firm*—Brian L. Ribando; Joseph R. Spalla

[57] ABSTRACT

A conical compression spring having the characteristics of a cylindrical spring of much greater free length. The spring is characterized by wire whose diameter diminishes from base to apex end and by coils whose pitch diminishes from base to apex end such that the ratio of mean coil diameter to wire diameter is constant from coil to coil. Further, each coil diameter is preferably dimensioned to fit within the next larger coil permitting a spring to be designed which exhibits a small solid compressed height.

3 Claims, 4 Drawing Figures

U.S. Patent  Sept. 5, 1978  4,111,407
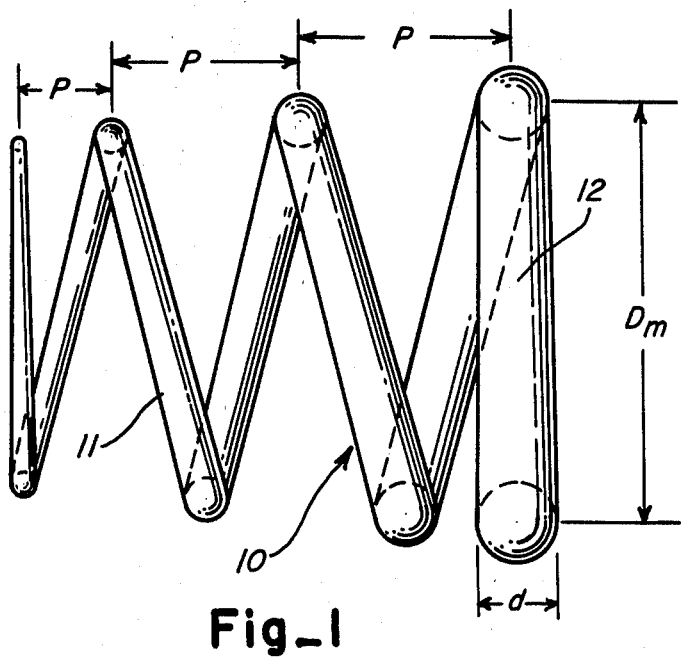
Fig_1
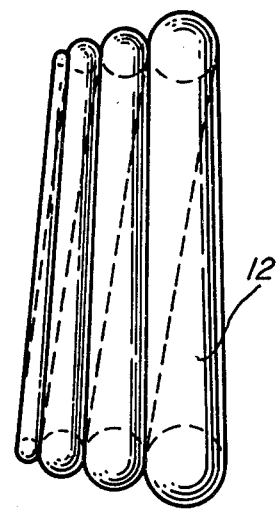
Fig_2
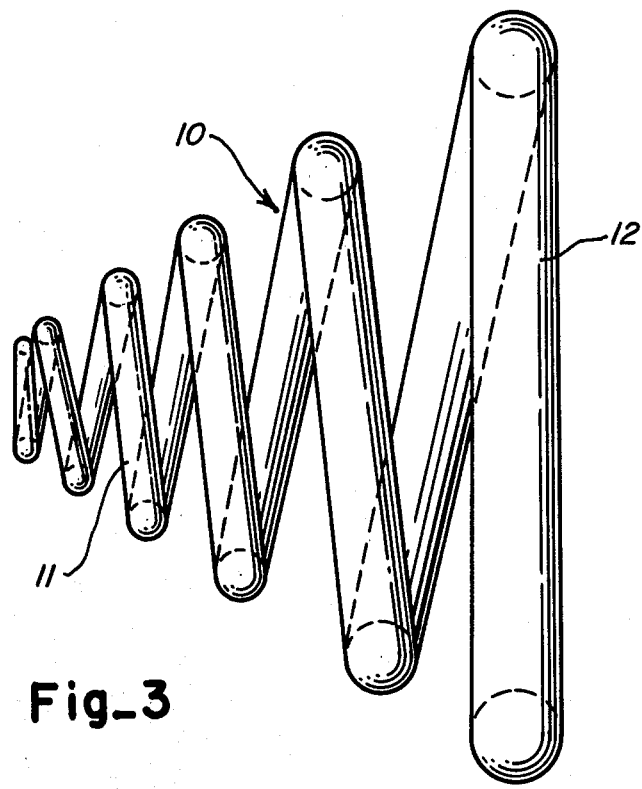
Fig_3
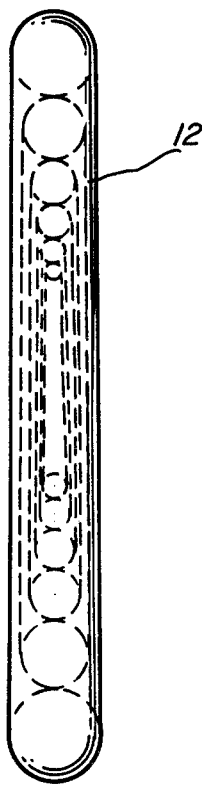
Fig_4

CONICAL COMPRESSION SPRING

This invention relates to conical compression springs; more particularly, it relates to conical compression springs designed to have the characteristics of cylindrical springs of greater free lengths; and specifically, to conical springs having wire diameters and coil pitches which decrease from base to apex end to provide a uniform coil to coil stress and spring rate.

In many applications where compression springs are employed to provide return forces, proper spring forces within stress limits are achieved only with cylindrical helical springs having a relatively long free length and a concomitant, compressed, relatively long, solid length. As a result, cylindrical helical compression springs require substantial envelope dimensions and relatively long actuators to compress them.

Known helical wound conical springs exhibit a non-linear force versus deflection characteristics, due to the fact that the spring rate and stress limits vary from coil to coil. This limits their use for many applications.

In accordance with the invention, there is provided a conical helical wound compression spring which has the linear force versus deflection characteristics of a much longer free length helically wound cylindrical spring. This characteristic of a helically wound cylindrical spring, where each coil of the spring provides maximum contribution, is achieved in a helically wound conical spring by winding it from wire whose cross-sectional area diminishes from end to end and which is wound with decreasing coil to coil pitch from base to apex end whereby the ratio of mean diameter (D) of each coil to the wire diameter ($d$) can be controlled to be a constant. In other words, the $D/d$ ratio and coil pitch, which affects mean coil diameter, can be controlled to provide a spring wherein the force versus deflection or rate is the same from coil to coil and each provides maximum contribution to the return force and distributes the stress equally. Such a helically wound conical compression spring can be dimensioned so that the mean diameter of each coil is such that it fits within the internal diameter of the next larger coil with the result that the solid compressed height is only as thick as the base coil.

Accordingly, the invention provides a conical spring which can be designed to provide constant stress and linear spring rate which avoids the limitations of conical springs generally available where stress limits vary from coil to coil and wherein spring rates vary from coil to coil with the result that forces that can be applied are limited to the weakest coil and to an average spring rate.

Accordingly, an object of the invention is in the provision of a helically wound conical spring which has the characteristics of a cylindrical spring of much larger free length.

Another object of the invention is to produce a helically wound conical compression spring wherein stress characteristics and spring rates are controlled by maintaining the ratio of mean coil diameter to wire diameter from coil to coil constant.

Another object of the invention is to provide a helically wound conical spring wound from wire tapering whose cross-section diminishes from end to end.

Other objects and many of the attendant advantages of this invention will be readily appreciated as the same becomes better understood by reference to the following detailed description when considered in connection with the accompanying drawing in which like reference numerals designate like or corresponding parts throughout the Figures thereof and wherein:

FIG. 1 is an elevational view of a helically wound conical compression spring in accordance with the invention;

FIG. 2 is an elevational view showing the spring of FIG. 1 fully compressed;

FIG. 3 is an elevational view of a helically wound conical compression spring designed to compress to the thickness of the base; and FIG. 4 is an elevational view of the spring of FIG. 3 fully compressed.

Referring now to the drawing there is shown in FIG. 1 a multi-coil helically wound compression spring generally designated by reference numeral 10 which is wound into an overall truncated conical shape. As shown, the steel wire 11 from which the spring is wound diminishes in cross-sectional area from the base end to the apex end with the largest cross-sectional area forming the base coil 12 of the conical spring 10. While the wire 11 is illustrated as cylindrical in cross-section, it should be understood that other wires 11 of diminishing cross-section might be square or rectangular in cross-section. Such diminishing cross-sectional wires can be formed on a centerless grinder or by tapered rolls. Under load, the spring 10 of FIG. 1 can be compressed to a small envelope as shown in FIG. 2.

Methods of winding the helical spring are well known and form no part of the present invention. However, the winding of the spring 10, as shown in FIG. 1, is such that the coil to coil pitch P relationship is controlled to maintain the ratio of the mean diameter $D_m$ of each coil to the wire diameter $d$ of that coil the same from coil to coil. Accordingly, a winder as will maintain $D/d$ constant should have a rate of traverse which controls pitch P as a function of wire diameter $d$.

Springs 10 of any number of coils and of any conical shape may be wound from different wire sizes of diminishing or stepped cross-section. With reference to FIG. 3, a spring 10 is shown wound to a conical shape which permits smaller diameter coils to fit into the next larger diameter coil as will result in a compressed spring as shown in FIG. 4 whose height is the thickness of the base coil 12.

After coiling springs 10, as depicted in FIGS. 1 and 3, they must be heat treated to a uniform desired hardness or tensile strength. Heat treating causes tensile and yield qualities to increase to a maximum useful range at which the modulus of elasticity and rigidity of the material provide the desired characteristics according to the stress levels and spring rates to be achieved. As, however, the cross-sectional area of the wire 11 diminishes, the heat treating step must accommodate this change to achieve uniform hardening. In accordance with the invention, the wound spring 10 may be differentially or incrementally hardened along its length by controlled induction heating or alternatively and preferably the spring may first be heated to a uniform temperature and differentially or incrementally quenched along its length to achieve desired uniform characteristics.

In the springs 10 of FIGS. 1 and 3, it is evident that the wire 11 employed has a varying diameter which decreases from the base toward the apex end of the conical spring and also that the pitch of the coils decrease from the base toward the apex end of the coils. By maintaining $D/d$ constant from coil to coil as may be accomplished by varying pitch, conical springs having linear force versus deflection characteristics of a free length much smaller than a corresponding cylindrical helical spring are possible.

While steel wire is most suitable for use in springs made in accordance with the invention, other materials such as plastic and non-ferrous materials such as aluminum, phospor bronze, etc. are within the invention.

The invention claimed is:

1. A spring exhibiting uniform stress and constant spring rate comprising:

a wire helically wound into a conical form to comprise a plurality of spring coils, said wire having a diameter $d$ which diminishes from one end to the other, and each said coil having a mean diameter $Dm$ which diminishes from one end of the form to the other, the largest wire cross-sectional area comprising the base end of the spring, and the pitch of the spring coils diminishing from one end of said form to the other, whereby the ratio $Dm/d$ is the same from coil to coil throughout the form thereby to provide a spring wherein each coil has the same stress limit.

2. A method of making conical compression springs having a linear spring constant comprising the steps of forming a wire tapering from end to end, and helically winding said wire into a conical shape while maintaining the ratio of mean coil diameter to wire diameter of each coil constant from coil to coil.

3. The method of claim 2 further comprising the steps of uniformly heating said spring, and differentially quenching said spring from end to end.

* * * * *